US006816114B1

(12) United States Patent
Moon et al.

(10) Patent No.: US 6,816,114 B1
(45) Date of Patent: Nov. 9, 2004

(54) SYSTEM FOR POLARIZATION TILTING AND MAIN BEAM STEERING OF AIRSHIP ANTENNA USING GPS

(75) Inventors: Sangman Moon, Daejeon (KR); Hyounkyoung Kim, Daejeon (KR); Inkyu Kim, Daejeon (KR); Sangjong Lee, Daejeon (KR); Taesik Kim, Daejeon (KR); Haechang Lee, Daejeon (KR); Chanhong Yeom, Daejeon (KR)

(73) Assignee: Korean Aerospace Research Institute, Yousung-gu (KR)

( * ) Notice: Subject to any disclaimer, the term of this patent is extended or adjusted under 35 U.S.C. 154(b) by 0 days.

(21) Appl. No.: 10/743,410

(22) Filed: Dec. 23, 2003

(30) Foreign Application Priority Data

Dec. 16, 2003 (KR) .............................. 10-2003-0091888

(51) Int. Cl.$^7$ ............................. H01Q 3/00; H04B 7/10
(52) U.S. Cl. ...................................... 342/359; 342/361
(58) Field of Search ................................ 342/359, 361; 455/63.4

(56) References Cited

U.S. PATENT DOCUMENTS

| | | | |
|---|---|---|---|
| 3,030,500 A | * 4/1962 | Katzin ........................ | 342/359 |
| 5,818,385 A | * 10/1998 | Bartholomew .............. | 342/372 |
| 5,917,446 A | * 6/1999 | Greenspan .................. | 342/373 |
| 6,512,481 B1 | * 1/2003 | Velazquez et al. .......... | 342/367 |

OTHER PUBLICATIONS

N.N. Borisov et al., Alignment of antennas operating on tropospheric links, Telecommunications–and–Radio–Engineering–Part–1 vol. 28(2), p. 29–31, Feb. 1974 (Translation of: Elektrosvyaz (USSR), vol. 28(2), p. 40–42, Feb. 1974).*

J. Rogers, The global autotracker–an automatic antenna pointing mechanism, Microwaves and RF Conference Proceedings, p. 191, Oct. 1995.*

* cited by examiner

Primary Examiner—Bernarr E. Gregory
Assistant Examiner—Fred H Mull
(74) Attorney, Agent, or Firm—Armstrong, Kratz, Quintos, Hanson & Brooks, LLP (57) ABSTRACT

The present invention relates to a system for tilting polarization and steering main beam of airship antenna comprises: a $1^{st}$ GPS receiver, which is located in the airship; a $2^{nd}$ GPS receiver, which is located in the ground station; an airship antenna database for extracting the radiation pattern information of airship antenna and polarization information according to the posture of the antenna based on the position information of the airship; a ground station antenna database for extracting the radiation pattern information of ground station antenna and polarization information according to the posture of the antenna based on the position information of the ground station; a polarization and main beam direction correction operating device for computing the correction value of polarization and main beam direction of the airship antenna and the ground station antenna based on the position information of the airship and the ground station received from the $1^{st}$ GPS receiver and the $2^{nd}$ GPS receiver; and an airship antenna controller for correcting the posture of the airship antenna by controlling tilting the polarization and steering the main beam direction of the airship antenna based on the corrected value received from the polarization and main beam direction correction operating device.

11 Claims, 5 Drawing Sheets

SYSTEM FOR POLARIZATION TILTING AND MAIN BEAM STEERING OF AIRSHIP ANTENNA USING GPS

FIELD OF THE INVENTION

The present invention relates to an airship, and more particularly, to a system for tilting polarization and steering main beam of airship antenna and ground station antenna using GPS (Global Positioning System), which can maintain reliable telecommunication link by aligning polarization and main beam of airship antenna and ground station antenna each other from azimuth and elevation coordinates of airship.

PRIOR ART

Generally, an high altitude unmanned airship makes a long stay at an altitude of 10–20 Km to perform various functions of satellite such as telecommunication relay, remote exploration, weather forecast, scouting and monitoring and the like.

This airship can float by itself by buoyancy difference from air, so that it flies through the stratosphere, stable air layer, and performs these functions.

Figure 1:
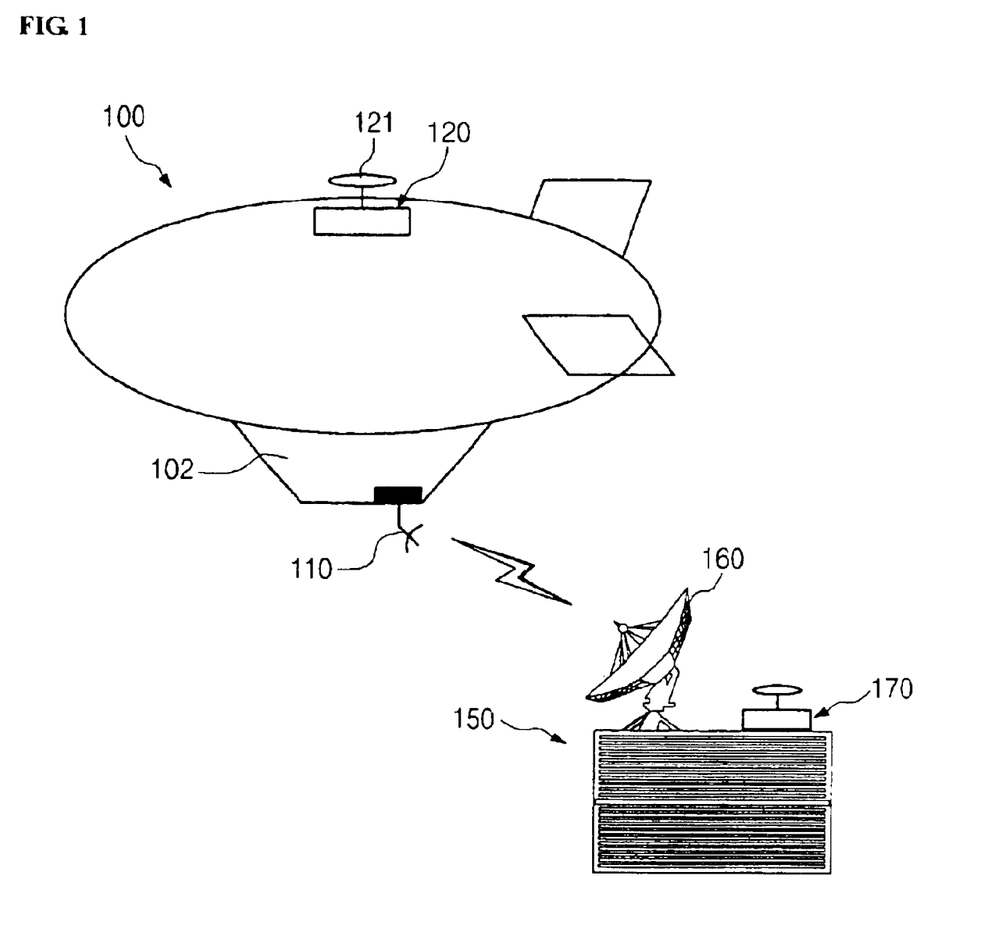
FIG. 1 represents the configuration of ordinary airship ground station system.

FIG. 1 represents the configuration of general airship ground station system. Wherein, airship and ground station system means airship 100 and ground station 150, which communicates with the airship 100, and it is applied over the whole specification.

As shown in FIG. 1, the $1^{st}$ GPS receiver 120 having GPS antenna 121 is located in the airship 100.

The airship 100 includes shelter 102, which is equipped with telecommunication device, engine, equipment and the like, in the bottom part of it.

The shelter 102 includes airship antenna, which is the antenna for communicating with ground station 150 and is called "airship communication antenna" sometimes.

And, the ground station 150 makes wireless communication with the airship 100 and receives information from the airship 100. The ground station 150 is divided into stationery station and moving station.

The ground station 150 includes ground station antenna 160 for communicating with the airship 100 and the $2^{nd}$ GPS receiver 170 for receiving the position information of the ground station 150.

In the meantime, the airship 100 should maintain reliable communication link to perform the functions mentioned above, and many techniques have been developed for it as below.

Firstly, according to S/W techniques, these methods lower the error rate of data by communication system using signal process and modulation to maintain reliable communication link between airship and ground station.

According to H/W techniques, many antennas are used. They include dual polarization antenna using vertical and horizontal polarization in the same time, high gain low lobe antenna and adaptive antenna.

However, conventional methods mentioned above have problems as below.

That is, the conventional methods need many test processes such as the test of database to reduce error rate that happens in communication link maintenance process. And consequently, cost gets higher for communication link maintenance.

According to one of conventional methods, an airship 100 is equipped with omni-directional antenna for communication link maintenance, but this method has low efficiency on electric power.

And, there is no method regarding to steering main beam direction and tilting polarization between an airship 100 and ground station 150 by using GPS 120 to maintain reliable communication link.

SUMMARY OF THE INVENTION

The present invention was devised to solve the problems mentioned above.

An object of the present invention is to provide a system for tilting polarization and steering main beam of airship antenna, which can maintain reliable communication link by aligning polarization between airship antenna and ground station antenna based on information of azimuth and elevation of airship using GPS.

Other object of the present invention is to provide a system for tilting polarization and steering main beam of airship antenna, which can maintain reliable communication link by aligning main beam between airship antenna and ground station antenna based on information of azimuth and elevation of airship using GPS.

Still another object of the present invention is to provide a system for tilting polarization and steering main beam of airship antenna, which can provide safe control for devices in airship by tilting polarization and steering main beam between airship antenna and ground station antenna to maintain reliable communication link.

In order to achieve the object, a system for tilting polarization and steering main beam of airship antenna according to the present invention comprises: a $1^{st}$ GPS receiver, which is located in the airship; a $2^{nd}$ GPS receiver, which is located in the ground station; an airship antenna database for extracting the radiation pattern information of airship antenna and polarization information according to the posture of the antenna based on the position information of the airship; a ground station antenna database for extracting the radiation pattern information of ground station antenna and polarization information according to the posture of the antenna based on the position information of the ground station; a polarization and main beam direction correction operating device for computing the correction value of polarization and main beam direction of the airship antenna and the ground station antenna based on the position information of the airship and the ground station received from the $1^{st}$ GPS receiver and the $2^{nd}$ GPS receiver; and an airship antenna controller for correcting the posture of the airship antenna by controlling the tilting polarization and the steering main beam direction of the airship antenna based on the corrected value received from the polarization and main beam direction correction operating device.

DETAILED DESCRIPTION OF THE PREFERRED EMBODIMENTS

Hereinafter, referring to the following appended drawings, the preferred embodiments of the present invention will be explained in detail.

Figure 2:
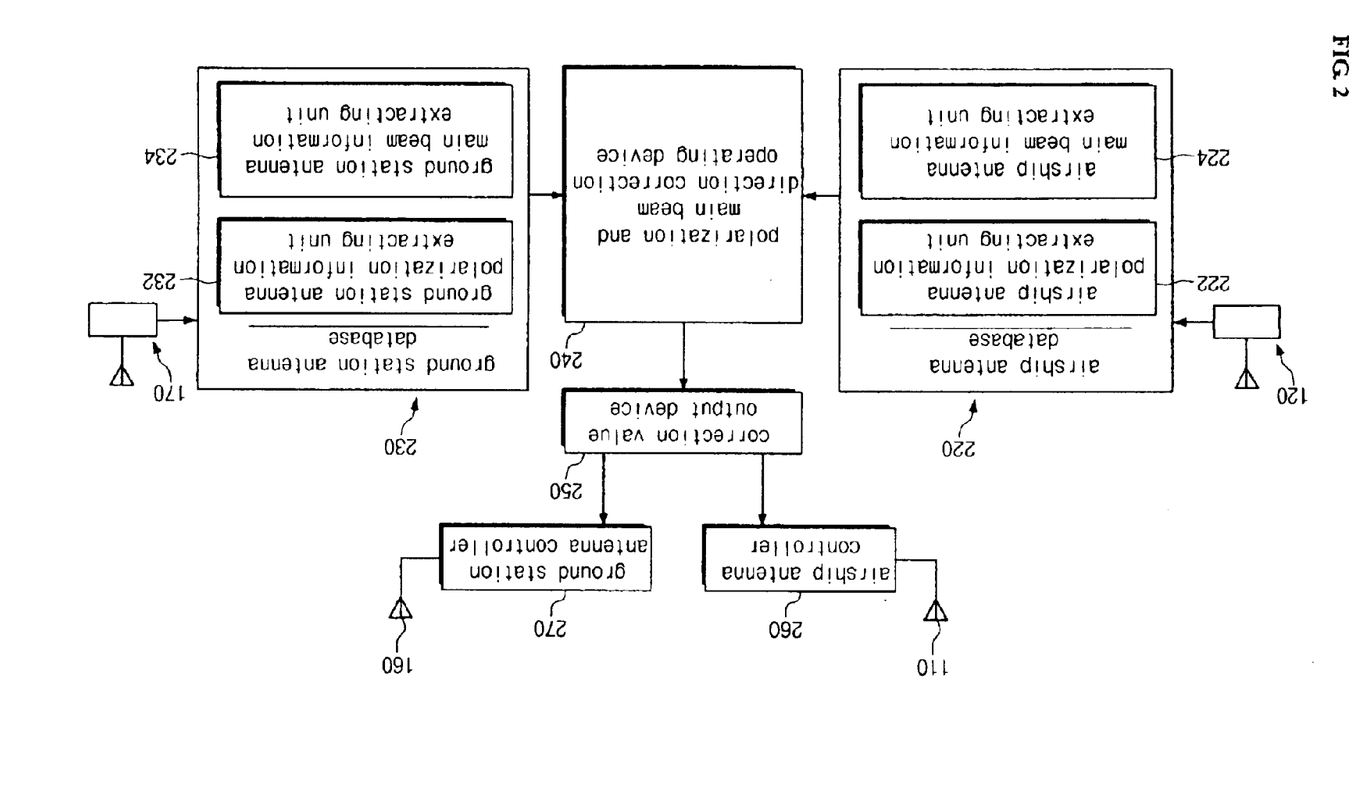
FIG. 2 is the block diagram of a system for tilting polarization and steering main beam of airship antenna according to preferable embodiment of the present invention.

FIG. 2 is the block diagram of a system for tilting polarization and steering main beam of airship antenna according to a preferred embodiment of the present invention.

As shown in FIG. 2, a system for tilting polarization and steering main beam of airship antenna according to a preferred embodiment of the present invention comprises an airship antenna 110, ground station antenna 160, a $1^{st}$ GPS receiver 120 and a $2^{nd}$ GPS receiver 170, which are located in the airship 100 and the ground station 150, an airship antenna database 220, a ground station antenna database 230, a polarization and main beam direction correction operating device 240, correction value output device 250, airship antenna controller 260 and ground station antenna controller 270.

The airship antenna database 220 extracts the radiation pattern information of the airship antenna 110 and polarization information according to the posture of the airship antenna 110 based on the position information of the airship 100 received from the $1^{st}$ GPS receiver 120.

The ground antenna database 230 extracts the radiation pattern information of the ground station antenna 160 and polarization information according to the posture of the ground station antenna 160 based on the position information of the ground station 110 received from the $2^{nd}$ GPS receiver 170.

The polarization and main beam direction correction operating device 240 corrects polarization and main beam direction between the airship antenna 110 and the ground station antenna 160 based on present polarization received from the airship antenna database 220 and the ground station antenna database 230, the information of main beam direction and the position information of the airship 100 and the ground station 150 received from the $1^{st}$ GPS receiver 120 and the $2^{nd}$ GPS receiver 170.

The correction value output device 250 outputs corrected polarization value and corrected main beam direction received from the polarization and main beam direction correction operating device 240.

The airship antenna controller 260 is located in the shelter 102 of the airship 100 and corrects the posture of the airship antenna 110 by controlling polarization tilting and main beam steering of the airship antenna 110 based on corrected value received from the correction value output device 250.

The ground station antenna controller 270 is located in the ground station 150 and corrects the posture of the ground station antenna 110 by controlling polarization tilting and main beam steering of the ground station antenna 110 based on corrected value received from the correction value output device 250.

As shown in FIG. 2, the airship antenna database 220 comprises airship antenna polarization information extracting unit 222 and airship antenna main beam direction information extracting unit 224.

The airship antenna polarization information extracting unit 222 extracts the information of polarization according to the posture in radiation patterns of the airship antenna 110 based on the position information of the airship 100 received from the $1^{st}$ GPS receiver 120.

The airship antenna main beam direction information extracting unit 224 extracts the information of main beam direction in radiation patterns of the airship antenna 110 based on the position information of the airship 100 received from the $1^{st}$ GPS receiver 120.

Also, as shown in FIG. 2, the ground station antenna database 230 comprises ground station antenna polarization information extracting unit 232 and ground station antenna main beam direction information extracting unit 234.

The ground station antenna polarization information extracting unit 232 extracts the information of polarization according to the posture in radiation patterns of the ground station antenna 160 based on the position information of the ground station 150 received from the $2^{nd}$ GPS receiver 170.

The ground station antenna main beam direction information extracting unit 234 extracts the information of main beam direction in radiation patterns of the ground station antenna 160 based on the position information of the ground station 150 received from the $2^{nd}$ GPS receiver 170.

Figure 3:
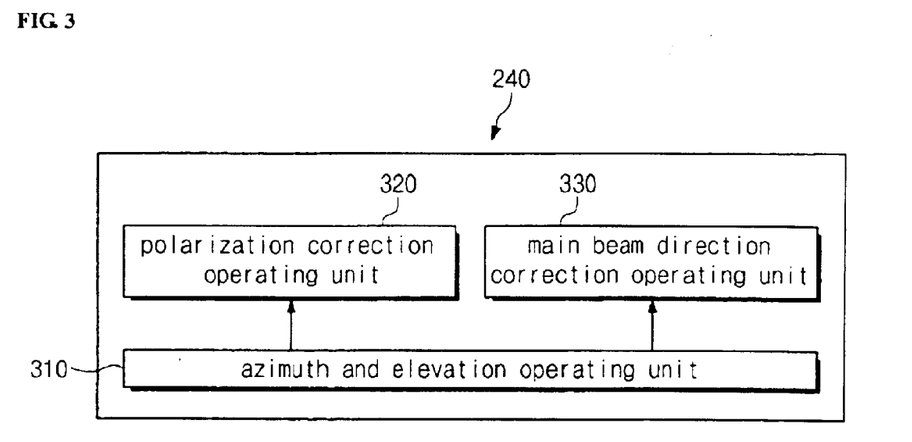
FIG. 3 is the detailed block diagram of polarization and main beam direction correction operating device of FIG. 2.

FIG. 3 is the detailed block diagram of polarization and main beam direction correction operating device of FIG. 2. As shown in FIG. 3, the polarization and main beam direction correction operating device 240 comprises azimuth and elevation operating unit 310, polarization correction operating unit 320 and main beam direction correction operating unit 330.

The azimuth and elevation operating unit 310 computes the azimuth and elevation between the airship 100 and the ground station 150 based on the position information of the airship 100 and the ground station 150 received from the $1^{st}$ GPS receiver 120 and the $2^{nd}$ GPS receiver 170.

The polarization correction operating unit 320 computes polarization correction value between the airship 100 and the ground station 150 based on the azimuth and elevation information received from azimuth and elevation operating unit 310 and information received from the airship antenna database 220 and the ground station antenna database 230.

The main beam direction correction operating unit 330 computes main beam correction value between the airship 100 and the ground station 150 based on the azimuth and elevation information received from azimuth and elevation operating unit 310 and information received from the airship antenna database 220 and the ground station antenna database 230.

Figure 4:
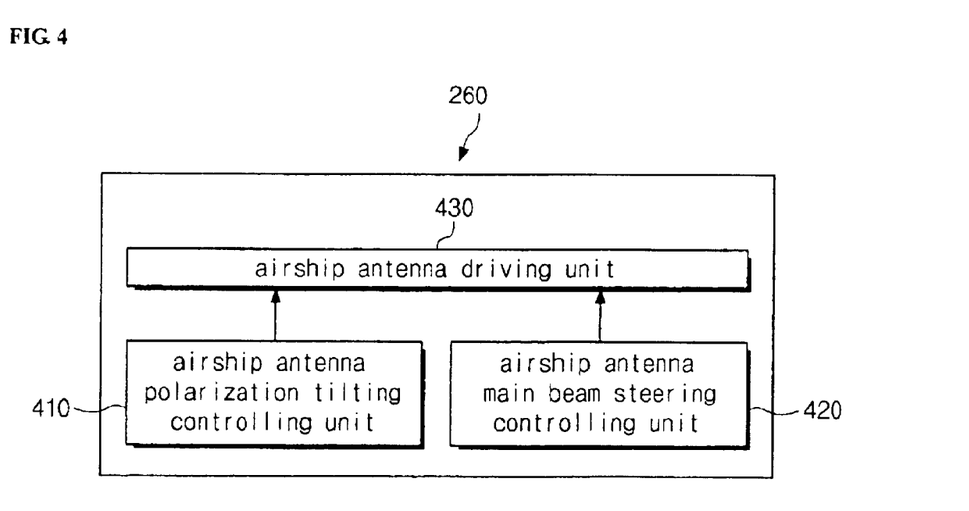
FIG. 4 is the detailed block diagram of airship antenna controller of FIG. 2.

FIG. 4 is the detailed block diagram of airship antenna controller of FIG. 2. As shown in FIG. 4, the airship antenna controller 260 comprises airship antenna polarization tilting controlling unit 410, airship antenna main beam steering controlling unit 420 and airship antenna driving unit 430.

The airship antenna polarization tilting controlling unit 410 generates polarization tilting control signal for the airship antenna 110 based on polarization correction value received from the correction value output device 250.

The airship antenna main beam steering controlling unit 420 generates main beam steering control signal for the airship antenna 110 based on main beam direction correction value received from the correction value output device 250.

The airship antenna driving unit 430 drives the airship antenna 110 to correct the posture of the airship 100 based on the control signals received from the airship antenna polarization tilting controlling unit 410 and the airship antenna main beam steering controlling unit 420.

Figure 5:
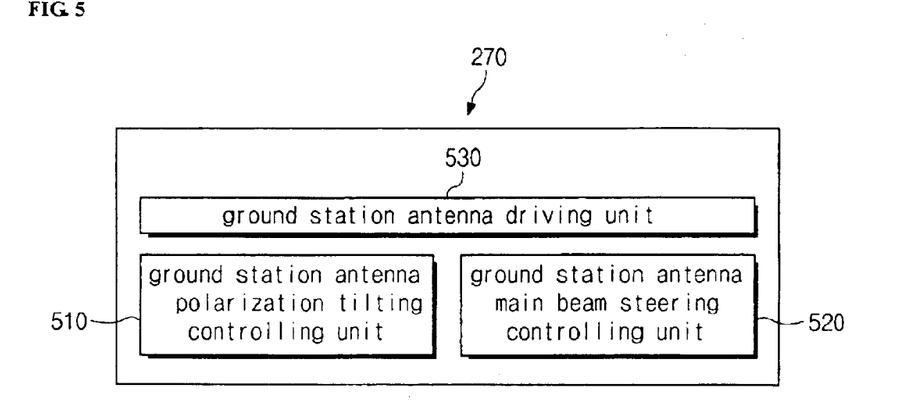
FIG. 5 is the detailed block diagram of ground station antenna controller of FIG. 2.

FIG. 5 is the detailed block diagram of ground station antenna controller of FIG. 2. As shown in FIG. 5, the ground station antenna controller 270 comprises ground station antenna polarization tilting controlling unit 510, ground station antenna main beam steering controlling unit 520 and ground station antenna driving unit 530.

The ground station antenna polarization tilting controlling unit 510 generates polarization tilting control signal for the ground station antenna 160 based on polarization correction value received from the correction value output device 250.

The ground station antenna main beam steering controlling unit 520 generates main beam steering control signal for the ground station antenna 160 based on main beam direction correction value received from the correction value output device 250.

The ground station antenna driving unit 530 drives the ground station antenna 160 to correct posture of the ground station 160 based on the control signals received from the ground station antenna polarization tilting controlling unit 510 and the ground station antenna main beam steering controlling unit 520.

Hereinafter, the operation for tilting polarization and steering main beam direction between two antennas 110, 160 by correcting posture of them will be described.

Firstly, coordinates system for representing the azimuth and elevation of the airship antenna 110 and the ground station antenna 160 will be described.

Figure 6:
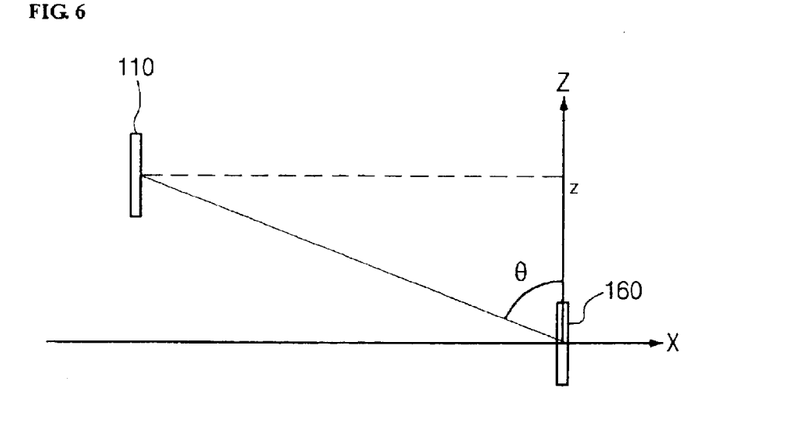
FIG. 6 is elevation coordinates system representing elevation between airship antenna and ground station antenna.
Figure 7:
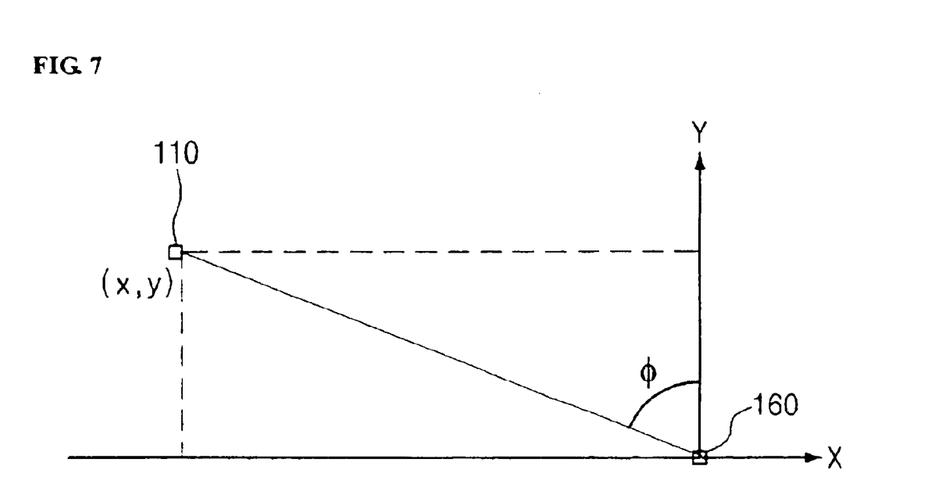
FIG. 7 is azimuth coordinates system representing azimuth between airship antenna and ground station antenna.

FIG. 6 is elevation coordinates system representing elevation between airship antenna and ground station antenna and FIG. 7 is azimuth coordinates system representing azimuth between airship antenna and ground station antenna.

As shown in FIG. 6 and FIG. 7, the elevation angle (or height) of the airship antenna 110 to the ground station antenna is 'θ' (or 'z') and the azimuth coordinate of the airship antenna 110 to the ground station antenna is (x, y) (or 'φ')

The airship antenna polarization information extracting unit 222 receives position information of the airship 100, that is elevation information and azimuth information from the 1$^{st}$ GPS receiver 120 and extracts the polarization information according to the posture of the airship antenna 110 based on the received information.

That is, the airship antenna polarization information extracting unit 222 extracts the polarization information according to the posture of the airship antenna 110 in real time and transmits it to the polarization correction operating unit 320.

And, the airship antenna main beam direction information extracting unit 224 receives the elevation information and azimuth information of the airship 100 from the 1$^{st}$ GPS receiver 120 in real time, extracts the main beam direction information according to the posture of the airship antenna 110 based on the received information in real time and transmits it to the main beam direction correction operating unit 330.

In the same manner, the ground station antenna polarization information extracting unit 232 extracts polarization information according to the posture of the ground station antenna 160 and transmits it to the polarization correction operating unit 320. The ground station antenna main beam direction information extracting unit 234 extracts main beam direction information according to the posture of the ground station antenna 160 and transmits it to the main beam direction correction operating unit 330.

In the embodiment of the present invention, the ground station 150 includes the 2$^{nd}$ GPS receiver 170, which receives the position information of the ground station 150 in real time, but if the ground station 150 is stationery station, the ground station 150 don't have to include the 2$^{nd}$ GPS receiver 170 because position information is set already.

In the meantime, the azimuth and elevation operating unit 310 decodes the position information between the airship 100 and the ground station received from the 1$^{st}$ GPS receiver 120 and the 2$^{nd}$ GPS receiver 170 (fixed position information of the ground station if the ground station is stationery station) and computes the elevation angle (θ) and azimuth coordinates (x, y) (or azimuth angle 'φ') between the airship 100 and ground station 150.

And, the polarization correction operating unit 320 performs the operation of polarization correction based on azimuth coordinates (x, y) and elevation angle (θ) received from the azimuth and elevation operating unit 310, the polarization information of the airship antenna 110 received from the airship antenna polarization information extracting unit 222 and the polarization information of the ground station antenna 160 received from the ground station antenna polarization information extracting unit 232.

In the same manner, the main beam direction correction operating unit 330 perform the operation of main beam direction correction based on azimuth coordinates (x, y) and elevation angle (θ) received from the azimuth and elevation operating unit 310, the main beam direction information of the airship antenna 110 received from the airship antenna main beam direction information extracting unit 224 and the main beam direction information of the ground station antenna 160 received from the ground station antenna main beam direction information extracting unit 234.

Hereinafter, the operation of correction for the polarization and main beam direction performed by the polarization correction operating unit 320 and the main beam direction correction operating unit 330 will be described in detail.

Firstly, the information of initial polarization and initial main beam direction is set in the polarization correction operating unit 320 and the main beam direction correction operating unit 330 (for example, initial polarization and main beam direction is same and tilting angle of polarization is '0°').

As the airship 100 fly in the orbit, the relative position is changed between the airship 100 and the ground station 150, therefore the polarization and main beam direction between the airship antenna 110 and the ground station antenna 160 are change, so the correction of them is needed.

For an example, if the elevation angle is changed by −30° and azimuth angle is changed +20°, the correction for changing the elevation angle by +30° and azimuth angle by −20° is performed to make the polarization and main beam direction initial condition.

The corrected value is outputted to the corrected value output device 250 and the corrected value output device 250 transmits it to the airship antenna polarization tilting controlling unit 410, the airship antenna main beam steering controlling unit 420, the ground station antenna polarization tiling controlling unit 510 and the ground station antenna main beam steering controlling unit 520 through wire or wireless communication link.

The airship antenna polarization tilting controlling unit 410 generates polarization tilting control signal based on the received polarization correction value and transmits it to the airship antenna driving unit 430.

In the same manner, the airship antenna main beam direction steering controlling unit 420 generates main beam steering control signal based on the received main beam correction value and transmits it to the airship antenna driving unit 430.

And, the airship antenna driving unit 430 receives polarization tilting control signal and main beam steering control signal from the airship antenna polarization tilting controlling unit 410 and the airship antenna main beam steering controlling unit 420 and drives the airship antenna 110 to correct the posture of the airship antenna 110 based on the received control signal.

Hereinafter, the correction of the posture of the ground station antenna 160 will be described. The ground station antenna control device 270 performs the same process as the airship antenna control device 260.

That is, the ground station antenna polarization tilting controlling unit 510 and the ground station antenna main beam direction steering controlling unit 520 receive polarization correction value and main beam correction value, generates polarization tilting control signal and main beam steering control signal and transmits it to the ground station antenna driving unit 530.

And, the ground station antenna driving unit 530 receives polarization tilting control signal and main beam steering control signal from the ground station antenna polarization tilting controlling unit 510 and the airship antenna main beam steering controlling unit 520 and drives the ground station antenna 160 to correct the posture of ground station antenna 160 based on the received control signal.

The airship antenna 110 and ground station antenna 160 are driven by control signal as the process above, so that Polarization and main beam between the airship antenna 110 and ground station antenna 160 is aligned together.

If the polarization between two antennas 110, 160 is aligned together, reliable communication is possible, and consequently, reliable communication link between two stations can be maintained.

Also, If the main beam of two antennas 110, 160 is aligned together, electric wave can hold high electric power, so that reliability of data transmitted/received get higher.

The airship database 220, the ground station database 230 and polarization and main beam direction correction operating device 240 can be located in anyplace of the airship 100, therefore the scope of the present invention is not limited by that.

The present invention has some advantages as below.

Firstly, reliable communication link can be maintained by correcting the postures of airship antenna and ground station antenna based on extracted azimuth and elevation information of airship using GPS and tilting polarization.

Secondly, reliable communication link can be maintained by correcting the postures of airship antenna and ground station antenna based on extracted azimuth and elevation information of airship using GPS and steering main beam.

Thirdly, it costs low to maintain reliable communication link by using existing GPS receiver without new equipment.

Fourthly, stability and reliability can be improved by maintaining reliable communication link according to tiling polarization and steering main beam.

Although the present invention is explained by referring to the preferred embodiments shown above, but various modifications and transformations can be made without departing from the spirit and scope of the invention. Therefore, it is obvious which claims as below include various modifications and transformations belonging to the scope of the invention.

What is claimed is:

1. A system for tilting polarization and steering main beam of airship antenna using GPS comprising:

a $1^{st}$ GPS receiver, which is located in the airship;

a $2^{nd}$ GPS receiver, which is located in the ground station;

an airship antenna database for extracting the radiation pattern information of airship antenna and polarization information according to the posture of the antenna based on the position information of the airship;

a ground station antenna database for extracting the radiation pattern information of ground station antenna and polarization information according to the posture of the antenna based on the position information of the ground station;

a polarization and main beam direction correction operating device for computing the correction value of polarization and main beam direction of the airship antenna and the ground station antenna based on the position information of the airship and the ground station received from the $1^{st}$ GPS receiver and the $2^{nd}$ GPS receiver; and an airship antenna controller for correcting the posture of the airship antenna by controlling the polarization and steering the main beam direction of the airship antenna based on the corrected value received from the polarization and main beam direction correction operating device.

2. The system for tilting polarization and steering main beam of airship antenna using GPS in claim 1, further comprising:

a ground station antenna correcting device for correcting the posture of the ground station antenna by controlling tilting the polarization and steering the main beam direction of the ground station antenna based on the corrected value received from the polarization and main beam direction correction operating device.

3. The system for tilting polarization and steering main beam of airship antenna using GPS in claim 2 wherein, the ground station controller comprises:

a ground station antenna polarization tilting controlling unit for generating polarization tilting control signal of the ground station antenna based on polarization correction value received from the correction value output device;

a ground station antenna main beam steering controlling unit for generating main beam steering control signal of the ground station antenna based on main beam direction correction value received from the correction value output device; and a ground station antenna driving unit for driving the airship antenna to correct posture of the airship based on the control signals received from the ground station antenna polarization tilting controlling unit and the ground station antenna main beam steering controlling unit.

4. The system for tilting polarization and steering main beam of airship antenna using GPS in claim 2, wherein the airship antenna controller comprises:

an airship antenna polarization tilting controlling unit for generating polarization tilting control signal of the airship antenna based on polarization correction value received from the correction value output device;

an airship antenna main beam steering controlling unit for generating main beam steering control signal of the airship antenna based on main beam direction correction value received from the correction value output device; and an airship antenna driving unit for driving the airship antenna to correct the posture of the airship based on the control signals received from the airship antenna polarization tilting controlling unit and the airship antenna main beam steering controlling unit.

5. The system for tilting polarization and steering main beam of airship antenna using GPS in claim 2, wherein the polarization and main beam direction correction operating device comprises:

an azimuth and elevation operating unit for computing the azimuth and elevation between the airship and the ground station based on the position information of the airship and the ground station received from the $1^{st}$ GPS receiver and the $2^{nd}$ GPS receiver;

a polarization correction operating unit for computing polarization correction value between the airship and the ground station based on the azimuth and elevation information received from azimuth and elevation operating unit and information received from the airship antenna database and the ground station antenna database; and a main beam direction correction operating unit for computing main beam correction value between the airship and the ground station based on the azimuth and elevation information received from azimuth and elevation operating unit and information received from the airship antenna database and the ground station antenna database.

6. The system for tilting polarization and steering main beam of airship antenna using GPS in claim 2, wherein the airship antenna database comprises:

an airship antenna polarization information extracting unit for extracting the information of polarization according to the posture of the airship antenna based on position information of the airship received from the $1^{st}$ GPS receiver; and an airship antenna main beam direction information extracting unit for extracting information of radiation pattern of the airship antenna based on the position information of the airship received from the $1^{st}$ GPS receiver.

7. The system for tilting polarization and steering main beam of airship antenna using GPS in claim 2, wherein the airship antenna database comprises:

a ground station antenna polarization information extracting unit for extracting the information of polarization according to posture of the ground station antenna 160 based on position information of the ground received from the $2^{nd}$ GPS receiver; and a ground station antenna main beam direction information extracting unit for extracting the information of radiation pattern of the ground station antenna based on position information of the ground station received from the $2^{nd}$ GPS receiver.

8. The system for tilting polarization and steering main beam of airship antenna using GPS in claim 1, wherein, the airship antenna controller comprises:

an airship antenna polarization tilting controlling unit for generating polarization tilting control signal of the airship antenna based on polarization correction value received from the correction value output device;

an airship antenna main beam steering controlling unit for generating main beam steering control signal of the airship antenna based on main beam direction correction value received from the correction value output device; and an airship antenna driving unit for driving the airship antenna to correct the posture of the airship based on the control signals received from the airship antenna polarization tilting controlling unit and the airship antenna main beam steering controlling unit.

9. The system for tilting polarization and steering main beam of airship antenna using GPS in claim 1, wherein the polarization and main beam direction correction operating device comprises:

an azimuth and elevation operating unit for computing the azimuth and elevation between the airship and the ground station based on the position information of the airship and the ground station received from the $1^{st}$ GPS receiver and the $2^{nd}$ GPS receiver;

a polarization correction operating unit for computing polarization correction value between the airship and the ground station based on the azimuth and elevation information received from azimuth and elevation operating unit and information received from the airship antenna database and the ground station antenna database; and a main beam direction correction operating unit for computing main beam correction value between the airship and the ground station based on the azimuth and elevation information received from azimuth and elevation operating unit and information received from the airship antenna database and the ground station antenna database.

10. The system for tilting polarization and steering main beam of airship antenna using GPS in claim 1, wherein the airship antenna database comprises:

an airship antenna polarization information extracting unit for extracting the information of polarization according to the posture of the airship antenna based on position information of the airship received from the $1^{st}$ GPS receiver; and an airship antenna main beam direction information extracting unit for extracting information of radiation pattern of the airship antenna based on the position information of the airship received from the $1^{st}$ GPS receiver.

11. The system for tilting polarization and steering main beam of airship antenna using GPS in claim 1, wherein the airship antenna database comprises:

a ground station antenna polarization information extracting unit for extracting the information of polarization according to posture of the ground station antenna 160 based on position information of the ground station received from the $2^{nd}$ GPS receiver; and a ground station antenna main beam direction information extracting unit for extracting the information of radiation pattern of the ground station antenna based on position information of the ground station received from the $2^{nd}$ GPS receiver.

* * * * *